Albert Hallowell's Tumbler Washer

3870

REISSUED MAR 8 1870

Witnesses.
John E Cerame
W. E. Rice

Gustavus A Dows
Calvin Dows
George S. Cushing

United States Patent Office.

GUSTAVUS D. DOWS, AND CALVIN DOWS, OF BOSTON, AND GEORGE S. CUSHING, OF LOWELL, MASSACHUSETTS, ASSIGNEES, BY MESNE ASSIGNMENTS, OF ALBERT HALLOWELL.

*Letters Patent No.* 52,565, *dated February* 13, 1866; *reissue No.* 3,870, *dated March* 8, 1870.

IMPROVED TUMBLER-WASHER

The Schedule referred to in these Letters Patent and making part of the same.

*To all whom it may concern:*

Be it known that ALBERT HALLOWELL, of Lowell, in the county of Middlesex, and State of Massachusetts, has invented a new and useful Apparatus for Washing Tumblers, of which the following is a full, clear, and exact description, reference being had to the accompanying drawings making part of this specification, in which—

Figure 1:
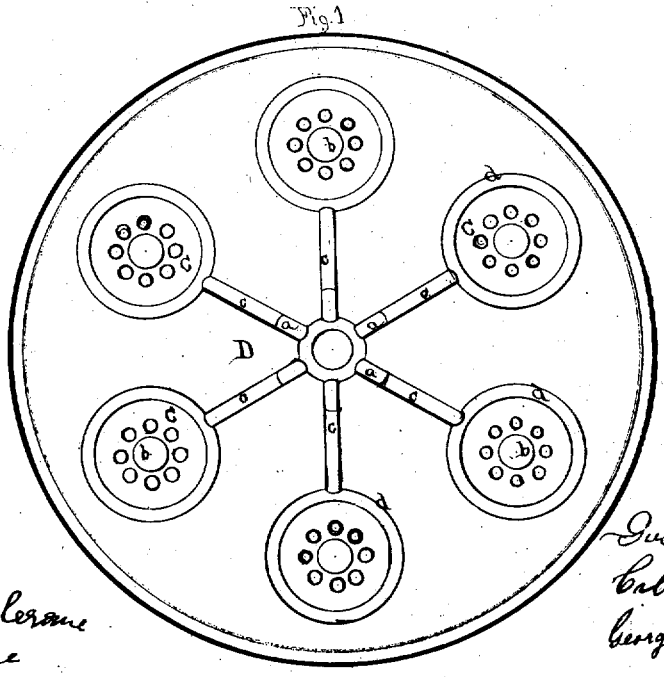

Figure 1 represents a top view, and

Figure 2:
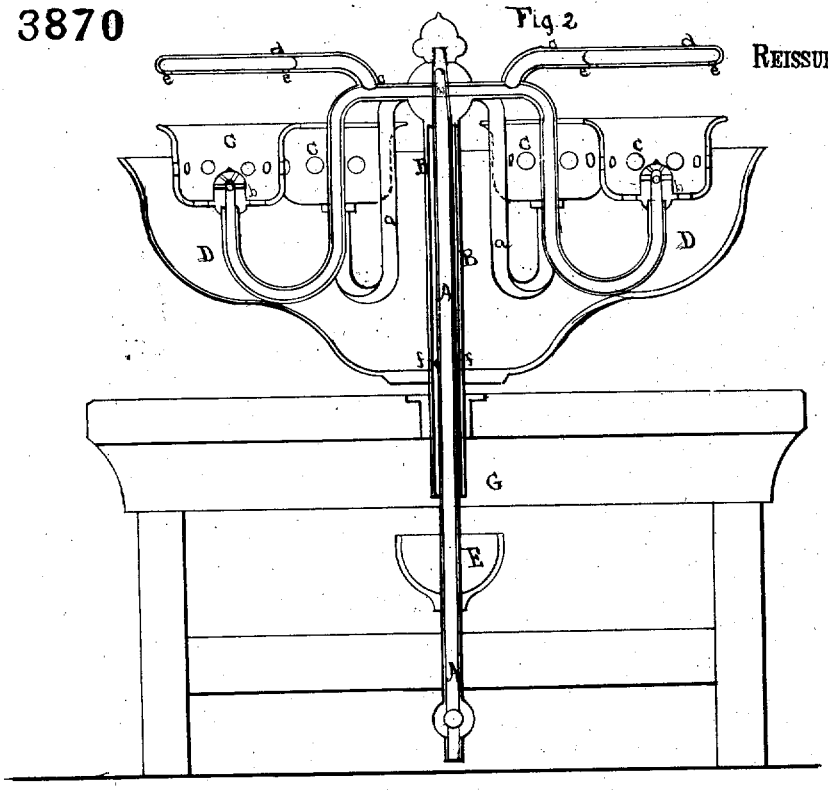

Figure 2, a vertical section.

The object of this invention is to wash or cleanse both the interior and the exterior surfaces of one or more tumblers simultaneously by the means employed, thereby rendering the tumbler-washing process one of greater certainty and facility than has heretofore been resorted to.

This invention consists, primarily, in the method substantially as described of simultaneously cleansing both the inside and outside of a tumbler or tumblers, by simultaneous jets or streams of water directed against their inner and outer surfaces, by means of perforated discharge-tubes or water-conducting and delivering devices, so arranged and provided with water-directing orifices above, around, and within the space to be occupied by each tumbler, as clearly shown in the drawings, that each of said directing-orifices or perforations shall direct a jet or stream of water either against the interior or the exterior surface of the tumbler placed in one of the cups C, as described, and so that all the directed streams of water shall act together, and wash or cleanse both the inside and the outside of the tumbler or tumblers at the same time.

This invention also consists in the method, substantially as described, of washing the outer surface of one or more tumblers by jets or streams of water directed and forced against such outer surface by means of one or more water-conducting and delivering devices, so arranged and provided with water-directing orifices, as specified, that said directing-orifices shall direct streams or jets of water into contact with or against the outer surface of the tumbler or tumblers, so as to wash or cleanse the same with certainty and facility, and in a superior manner.

This invention also consists in the method, substantially as described, of washing the inner surface of one or more tumblers by jets or streams of water directed and forced laterally, or laterally and obliquely, against such inner surface by means of water-conducting and delivering devices, so arranged and provided with water-directing orifices, as specified, that said directing-orifices shall direct jets or streams of water, which shall wash the inner surface of a tumbler or tumblers with certainty and facility, and in a superior manner.

This invention also consists in the method, substantially as described, of washing the inner and the outer surfaces of one or more tumblers simultaneously, and of disposing of the water, after it has performed the washing process, by the combination of a bowl or basin, D, a discharge-pipe, B, and a conduit, A, with inner and outer water-conducting and perforated delivering devices, so arranged that the water used for washing said tumbler or tumblers shall flow in at the conduit and through the water-directing orifices, and against the surfaces of one or more tumblers, into the basin and off through the discharge-pipe B, as described.

This invention also consists in the method, substantially as described, of washing the outer surface of one or more tumblers, and of disposing of the waste water by the combination of a basin, D, a discharge-pipe, B, and a conduit, A, with one or more exterior water-conducting and delivering devices, so arranged that the water used for washing the outer surface of the one or more tumblers shall flow in at the conduit, out through the water-directing orifices against the outer surface of the tumbler or tumblers, into the basin, and off through the discharge-pipe B, as described.

This invention also consists in the method, substantially as described, of washing the inner surface of one or more tumblers, and of disposing of the waste water by the combination of a basin, D, a discharge-pipe, B, and a conduit, A, with one or more inner conducting and delivering devices, so arranged that the water used for washing the inner surface of one or more tumblers shall flow in at the conduit, out through the laterally or the laterally and obliquely formed water-directing orifices against the inner surface of the tumbler or tumblers, into the basin, and off through the pipe B, as described.

This invention also consists in the receiving-cup E, in combination with the basin D and with the discharge-pipe B, when arranged to receive the water from the basin and convey or lead it to a suitable drain.

In the said drawings—

A denotes the vertical conduit or tube, arranged concentrically within a larger tube, B, which is closed at the top, and there provided with a series of branch tubes, *a a a a*, leading from it, and curved as shown in the drawings.

Each of these branch tubes terminates in an acorn-shaped and enlarged or dilated hollow nose, *b*, having a series of holes, through which water, when introduced under pressure into the conduit A, and forced therefrom through the branch tubes, will be caused to flow in one or more streams, directed by the holes or orifices, and forced against the different portions of the inside surface of the tumbler.

There is affixed to each branch pipe *a*, and with respect to the terminus thereof, as shown in the drawing, a cup, C, the sides and bottom of which are perforated.

Leading from each branch tube *a*, there is an auxiliary branch tube, *c*, which opens out of the tube *a* and into and supports a tubular jet-ring, *d*, arranged over the cup, as clearly shown in the drawings.

This jet-ring has a series of holes, *e*, made through the under side, and these holes or orifices *e* are intended for discharging and also for directing streams of water forcibly against the outer surface of a tumbler, when placed mouth downward within the cup C of and below such ring.

Underneath the series of cups is a basin, D, which is fixed to the pipe B, such pipe being provided with one or more holes, *f*, made laterally through it, and at or near the bottom of the inner surface of the basin.

Below the lower end of the pipe B there is a receiving-cup, E, which is fixed on the conduit A, and revolves with it.

It is intended that when the apparatus is in use it shall be mounted on a suitable stand, G, or in or on the counter of a store, mineral-water, beer, or soda-fountain, it being designed for washing the tumblers used by persons drinking thereat, and it may be revolved either by manual power or by mechanism suitably applied to it, the water for washing tumblers being let into the conduit A by a pipe properly connected therewith, so as to admit of the apparatus being revolved.

A tumbler, on being placed bottom up in any one of the cups, will be washed both on its interior and exterior surfaces simultaneously, and by one or more jets or streams of water directed and forced against such surfaces, thereby washing or cleansing each tumbler more thoroughly, with a greater degree of certainty and facility than has heretofore been performed.

The water, after having performed its office of washing and thoroughly cleansing the tumblers, being caught by the bowl or basin and led by the pipe B thereof into the cup E, from the said cup it may be dicharged into a suitable spout or conduit for conveying it to a drain.

Water forced through the orifices in the tubular annulii performs a separate and distinct function of cleansing the outside of the tumbler, and water forced through the holes in the nose *b* performs another distinct and separate function of cleansing the inside of the tumbler. Neither of the water-discharging devices is dependent on the other, but both contribute to the production of the desired result by their simultaneous action, and each confers utility upon the other and upon the whole apparatus.

It will be obvious that the enlarged or dilated hollow perforated nose *b* may be still more enlarged, both externally and in its internal cavity, and that the number of water-discharging orifices may be proportionally multiplied, though the size of the nose and the number of perforations shown and described are found to be sufficient for the purpose described.

We do not claim the mode, means, apparatus, or subject of the United States patent No. 48,934, granted July 25th, 1865, to Barney Hart; that is, we do not claim a foraminous shelf and one or more jet pipes arranged beneath it for discharging water through the shelf upward into and between tumblers placed thereon, and no device is seen in the drawings as described in the specification of said Hart for directing streams of water on to the outside of the tumbler, or laterally, against the inner sides thereof.

What is claimed is—

1. The method, substantially as described, of washing both the interior and exterior surfaces of one or more tumblers simultaneously by jets or streams of water directed and forced against their inner and outer surfaces by means of perforated discharge-tubes or water-conducting and delivering devices, so arranged and provided with water-directing orifices, substantially as specified, that said directing-orifices shall direct streams or jets of water, which shall act together, and wash or cleanse both the inside and outside of the tumbler or tumblers at the same time, as set forth.

2. The method, substantially as described, of washing the outer surface of one or more tumblers by streams or jets of water directed or forced against such outer surface by means of one or more water-conducting and delivering devices, so arranged and provided with water-directing orifices, as specified, that said directing-orifices shall direct streams or jets of water which shall wash the outer surface of the tumbler or tumblers, as set forth.

3. The method, substantially as described, of washing the inner surface of one or more tumblers by jets or streams of water directed and forced laterally, or laterally and obliquely against such inner surface, by means of water-conducting and delivering devices so arranged within the tumbler or within the tumbler-space, and provided with water-directing orifices, as specified, that said directing-orifices shall direct jets or streams of water which shall wash the inner surface of the tumbler or tumblers, as set forth.

4. The method, substantially as described, of washing the inner and the outer surfaces of one or more tumblers simultaneously, and of disposing of the water after it has performed the washing process, by the combination of a bowl or basin, D, a discharge-pipe, B, and a conduit, A, with inner and outer water-conducting and perforated delivering and water-directing devices, arranged and operating substantially as set forth.

5. The method, substantially as described, of washing the outer surface of one or more tumblers, and of disposing of the waste water by the combination of a basin, D, a discharge-pipe, B, and a conduit, A, with one or more exterior conducting, and a perforated delivering and water-directing devices, arranged and operating substantially as set forth.

6. The method, substantially as described, of washing the inner surface of one more tumblers, and of disposing of the waste water by the combination of a basin, D, a discharge-pipe, B, and a conduit, A, with one or more inner conducting and perforated delivering and water-directing devices arranged within the tumbler or within the tumbler-space, and operating substantially as set forth.

7. The receiving-cup E in combination with the basin D, and with the discharge-pipe B, substantially as described.

GUSTAVUS D. DOWS.
CALVIN DOWS.
GEORGE S. CUSHING.

Witnesses:
JOHN E. CRANE,
W. E. RICE.